United States Patent
Hulslander

[15] 3,647,181
[45] Mar. 7, 1972

[54] VALVE WITH CONTROLLED SEAL DEFLECTION

[72] Inventor: William L. Hulslander, Bradford, Pa.
[73] Assignee: Dresser Industries, Inc., Dallas, Tex.
[22] Filed: Mar. 25, 1970
[21] Appl. No.: 20,471

Related U.S. Application Data

[63] Continuation of Ser. No. 682,255, Nov. 13, 1967, abandoned, Continuation-in-part of Ser. No. 650,953, July 3, 1967, Pat. No. 3,504,886, Continuation-in-part of Ser. No. 440,101, Mar. 16, 1965, Pat. No. 3,360,231.

[52] U.S. Cl. .........................................................251/317
[51] Int. Cl. ..............................................................F16k 5/00
[58] Field of Search.................251/358, 317, 184, 192, 183, 251/181, 180, 175, 328, 172

[56] References Cited

UNITED STATES PATENTS

| | | | |
|---|---|---|---|
| 2,505,270 | 4/1950 | Allen | 251/175 |
| 2,873,943 | 2/1959 | Williams | 251/175 |
| 2,985,422 | 5/1961 | Anderson et al. | 251/172 |

*Primary Examiner*—Samuel Scott
*Attorney*—Robert W. Mayer, Daniel Rubin, Peter J. Murphy, Douglas M. Clarkson, Roy L. Van Winkle and William E. Johnson, Jr.

[57] ABSTRACT

An elastomeric seal for a closure element in a fluid shutoff valve to seal the valve against leakage when in shutoff position. The seal is situated front and rear on the closure element and is constructed to have greater rear deflection then front to minimize shearing or scarifying thereof when encroached by the surface edge at which it is to be compressed into sealing relation.

14 Claims, 19 Drawing Figures

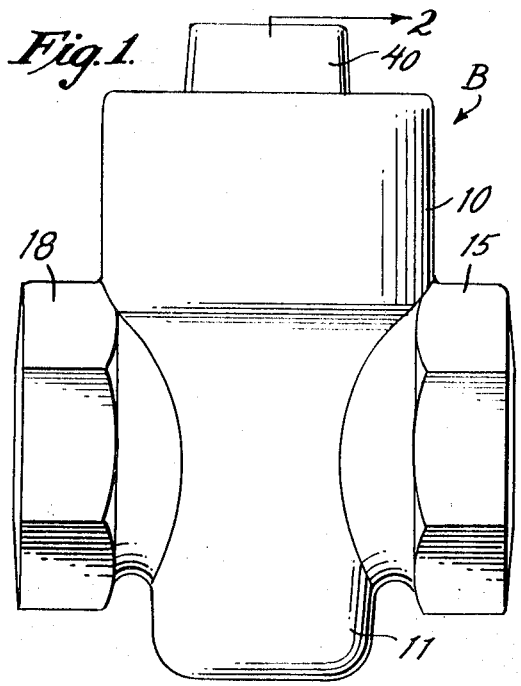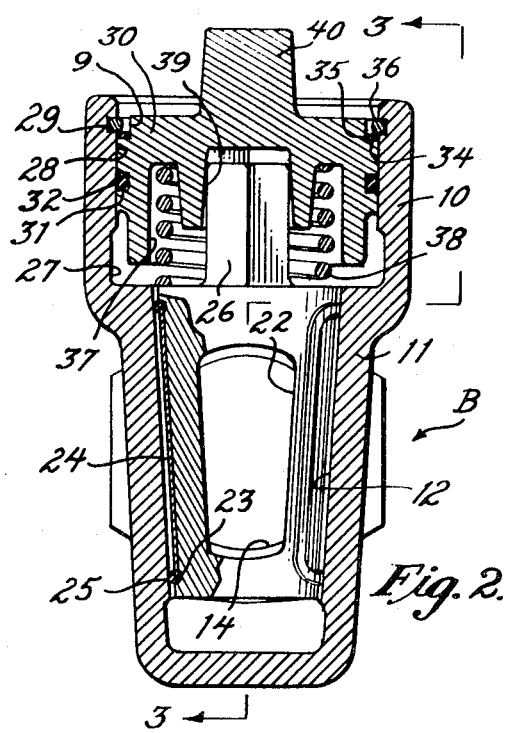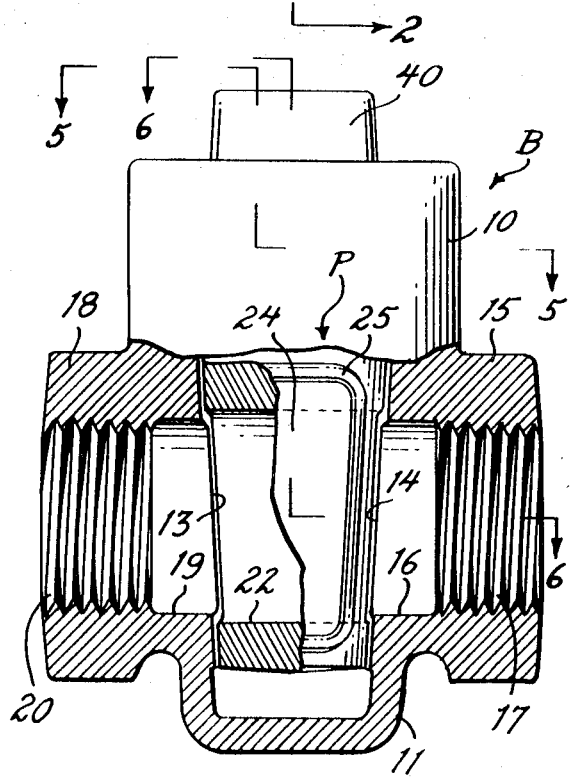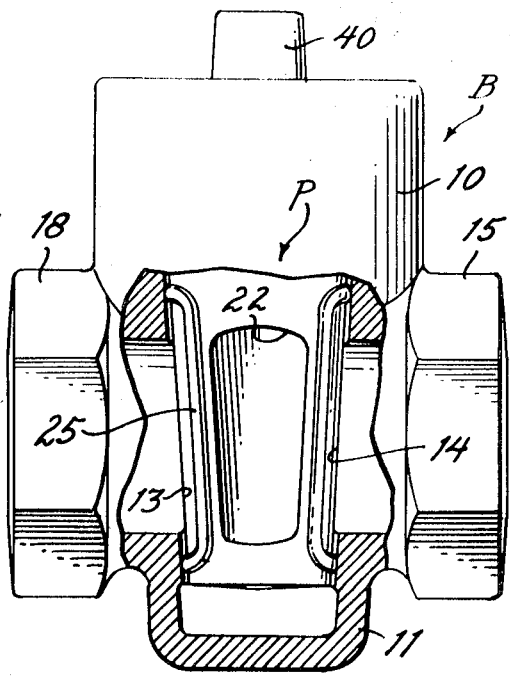

INVENTOR
WILLIAM L. HULSLANDER
BY Daniel Rubin
ATTORNEY.

INVENTOR.
WILLIAM L. HULSLANDER
BY Daniel Rubin

ATTORNEY

INVENTOR.
WILLIAM L. HULSLANDER
BY
ATTORNEY

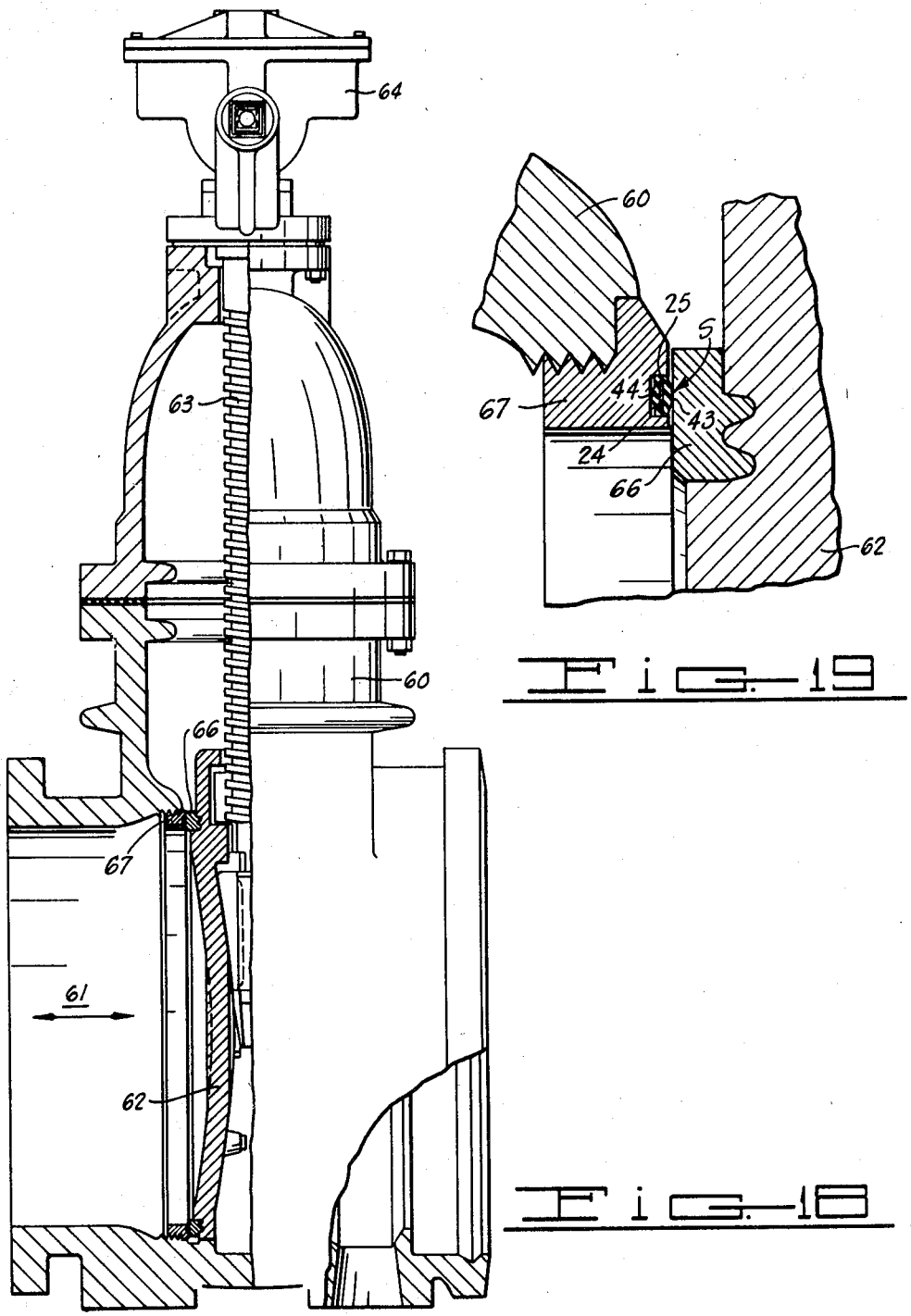

VALVE WITH CONTROLLED SEAL DEFLECTION

This application is a continuation-in-part of application Ser. No. 650,953 filed July 3, 1967 entitled "Valve Seal Construction" now U.S. Pat. No. 3,504,886 issued Apr. 7, 1970 and Ser. No. 440,101 filed Mar. 16, 1965 entitled "Plug Valve With Floating Seal," now U.S. Pat. No. 3,360,236, issued Dec. 26, 1967.

BACKGROUND OF THE INVENTION a. The art to which the invention pertains includes valves utilized in a piping system for controlling the passage for shutoff of fluid line contents and particularly to gaskets and seals employed in valves to ensure against leakage between the valve elements effecting shutoff.

b. In shutoff valves of a common variety such as gate valves, plug valves, butterfly valves and the like it is usual to employ a closure member comprising a gate, plug, and vane respectively which is movable within the valve body to either open or close the fluid flow passages therein. Whatever valve type is considered, the closure member is movable relative to a fixed seat or port in the body and a gasket seal is contained to be situated at the juncture ensuring a positive pressure seal therebetween during shutoff. The gasket is of an elastomeric material and in the prior art valves have usually comprised rubber or synthetics thereof which are inert as not to contaminate the fluid contents of the piping system.

Inherently, the seal when in its operative relation during valve shutoff is contained compressed between adjacent close fitting surfaces of relatively movable parts. In a gate valve these surfaces comprise the gate and adjacent body wall whereas in a plug valve they comprise the exterior plug surface contiguous to the body. Where the seal is permitted to partially or totally decompress or deflect by virtue of moving either the seal of the opposing surface free of one another, the seal when returned to its compressed relation is usually subject to a shearing action as it traverses the end edge of the opposing wall surface against which it is to be supported. That is, the uncompressed seal cross section being relatively large as compared to the lateral space it is to occupy when sealing, protrudes into an interfering and shearing encounter as it is relatively moved past the wall end. In a gate valve, this occurs as the gate is moved to and fro over the gasket while in a plug valve this occurs as the seal, if mounted on the plug, moves to and fro past the body ports.

The seal wear occasioned by the above shearing effect is of course a function of various factors predominate of which is the frequency of encounter occasioned by the service requirements of the particular valve. Where the need to open and close the valve is relatively high, the wear is correspondingly high and the seal becomes a high maintenance item rendering it both inconvenient and costly. It has accordingly long been desirable to overcome or at least minimize this problem associated with valve seals in the prior art whereby their life expectancy can be substantially extended free of maintenance.

SUMMARY

The invention relates to a novel elastomeric seal for use in a fluid control valve. For whatever valve type the seal is employed, it comprises a base supporting an elastomer composition front and rear critically constructed to provide greater compressive absorption in the rear than the front. By this means the front portion at which the shear reaction will be encountered, incurs a substantially reduced enlargement on decompression as to minimize or eliminate the shear effect as has been associated with such prior art seals. This result can be assured and enhanced by dimensionally providing the seal with sufficient length or width such that less than all or only partial front decompression occurs. By virtue of the enhanced physical properties afforded thereby, valves are able to operate dependably without the frequency of maintenance previously incurred.

It is, therefore, an object of the invention to provide an improved seal element for prevention of leakage in a fluid shutoff valve.

It is a further object of the invention to provide a seal element having improved wear properties for service in a shutoff valve as compared to prior art devices.

It is a further object of the invention to provide a novel seal element with properties as aforesaid constructed to incur reduced shearing, abrading or scarifying action in a valve as the closure member thereof is relatively moved toward and away from the seat or port.

It is a still further object of the invention to provide a seal as in the last recited object for use in a plug valve in which it also compensates for manufacturing tolerances between the plug and body.

BRIEF DESCRIPTION OF THE DRAWINGS

FIG. 1 is a view in side elevation of a plug valve in which the seal element of the invention is contained.

FIG. 2 is a section through the plug valve of FIG. 1 being taken about on the plane represented by the line 2—2 of FIG. 1.

FIG. 3 is a view taken normal to the showing of FIG. 2 with parts being shown in elevation and parts in section and with the valve in open position.

FIG. 4 is a view similar to FIG. 3 with the valve in closed position.

FIG. 18 is a section through a gate valve with a seal in accordance herewith.

FIG. 19 is a fragmentary enlargement of the seal in the gate valve of FIG. 18.

Figure 5:
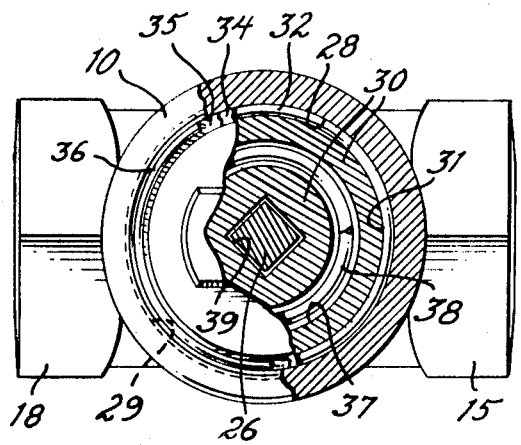
FIG. 5 is a top view partially in section and partially in elevation being taken about on the plane represented by the lines 5—5 of FIG. 3.
Figure 6:
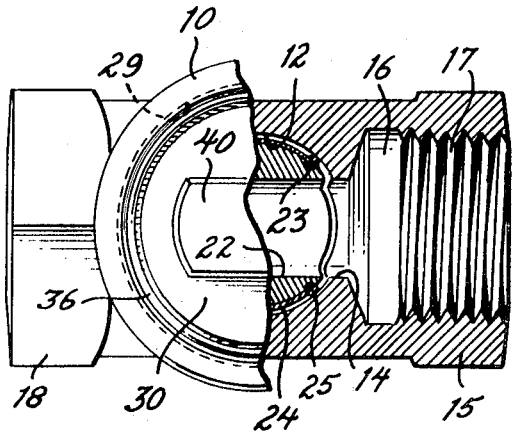
FIG. 6 is a view similar to FIG. 5 being taken about on the plane represented by the lines 6—6 of FIG. 3.

With reference to the drawings, the invention will be described in a preferred embodiment for use in a plug valve of a type disclosed in the parent application hereof. As can be seen in FIGS. 1-4, the valve includes a body or casing illustrated and referred to in its entirety by the reference character B. The body B comprises an upper cylindrical part 10 to which is integrally joined a conical well 11 presenting a tapered bore 12. Opening into the bore 12 of the well 11 from opposite sides are a pair of ports 13 and 14. One of these is the inlet port and the other an outlet port depending on the direction of flow of fluid through the valve.

Extending laterally outwardly from the port 14 is a boss 15 having a bore 16 which terminates in the port 14 and the outer portion of which is internally threaded as shown at 17 to provide for a connection of a fluid line thereto. The boss 15 will ordinarily be of hexagonal shape for wrench engaging purposes. There is also a boss 18 which extends laterally outwardly from the port 13 and which has a bore 19 terminating in the port 13 and the outer internally threaded portion 20.

Figures 7, 8, 9:
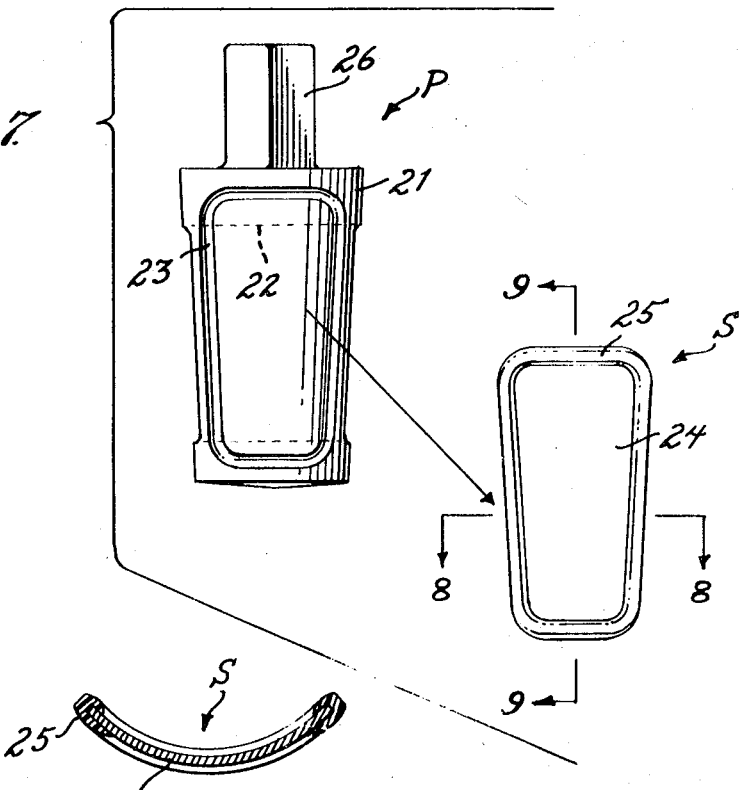
FIG. 7 is a view in elevation illustrating the plug and closure seal hereof in exploded relation.
FIG. 8 is a detailed section through the closure seal being taken about on the plane represented by the line 8—8 of FIG. 7.
FIG. 9 is a detailed section through the closure seal being taken about on the plane represented by the line 9—9 of FIG. 7.

A plug is referred to in its entirety by the reference character P (see FIG. 7). The plug P has a main body portion 21 of a conical contour complemental to the tapered bore 12 of the well 11 in which it is received. The plug 21 is formed with a transverse passage 22 of substantially the same size and shape as the ports 13 and 14 with which it aligns when the valve is in open position. Spaced substantially 90° from the ends of the passage 22 and disposed therebetween are a pair of shallow recesses 23 formed in the plug P. Received in each recess 23 and in floating relation with respect to the plug P is a closure or sealing element in accordance with the invention and referred to in its entirety by the reference character S as will be described below.

Integrally formed with a conical body 21 and extending upwardly therefrom is a shank 26 of noncircular formation such as the square-cross section illustrated. This shank 26 extends up into the cup-shaped recess 27 (see FIG. 2) provided by the cylindrical portion 10 of the valve body. The cylindrical part 10 has a bore at 28 which terminates at the top in an inwardly opening annular groove 29.

A spring backing and operating member 30 of cylindrical shape is received in the recess 27 which includes the bore 28. The outer cylindrical wall of the member 30 is formed with an annular groove 31 which receives an O-ring packing 32. At the top, this spring backing member 30 is formed with an annular recess providing a shoulder at 34 and a cylindrical wall 9 upstanding therefrom. Received in this shoulder 34 is a plastic bearing ring 35, such as Teflon, and a retaining ring 36 is received in the groove 29 and engages the upper face of the bearing ring 35.

The member 30 is formed with a downwardly opening annular recess 37 which receives an expansion coiled spring 38. The upper end of the spring 38 bears against the upper face of the plug body 21 with the shank 26 passing up through the spring. Member 30 also includes a central socket 39 of a noncircular shape corresponding to the shank 26 which is received therein, and at the top is provided with a wrench engaging member 40. It is evident that a wrench may be applied to the member 40 to rotate the member 30 and through the socket 39 and shank 26, the plug P. Thus, the plug P may be moved from either open or closed position to the other.

During such movement, the front face of the closure elements S hereof which includes the seal 25 hereof as will be described, passes over the edges of the ports 13 and 14 and also provides the bearing for the rotative movement. In closed position, one of the closure elements S will be opposite either port 13 or 14 and the other sealing element will be opposite the other port. Depending on the direction of the fluid flow, one of these ports will be the inlet port and the other the outlet port. Pressure from the fluid at the inlet side will, if of sufficient magnitude, compress the sealing material 25 into its recess 23 and the fluid will pass around the sealing material into the interior of the well. Thus, it will enter to behind the closure element at the outlet port and the fluid pressure thereat will force the closure element against the edges of the outlet port. After a period, the pressure within the valve is equalized at the outlet body port while the inlet closure element is approximately in balance with the fluid content under pressure. It is evident that the spring 38 consistently urges the conical plug P down into the well 11; thus, the force of this spring also urges the closure elements against the ports.

Figure 10:
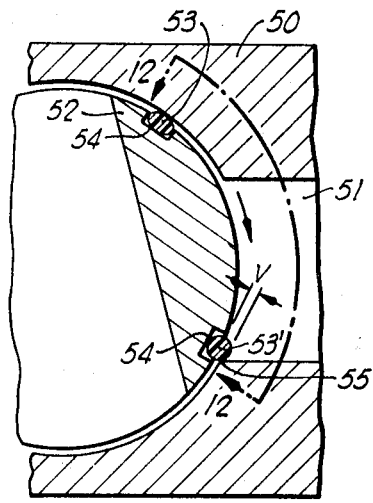
FIG. 10 is an enlarged sectional view of a plug valve with a seal in accordance with the prior art.
Figure 11:
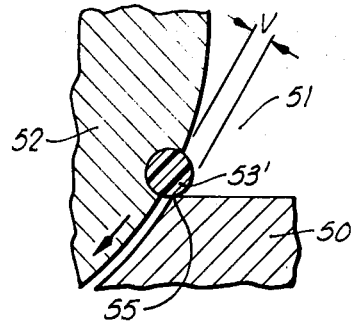
FIG. 11 is a fragmentary enlargement taken of the decompressed seal portion in FIG. 10.
Figure 12:
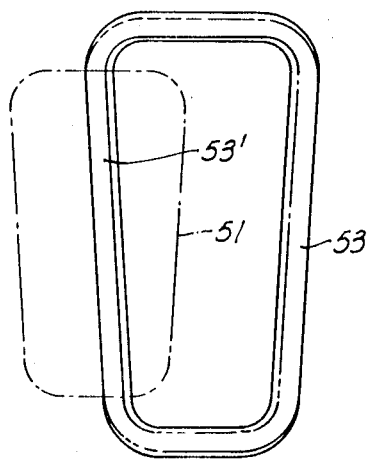
FIG. 12 is a view taken substantially along the lines 12—12 of FIG. 10.
Figure 13:
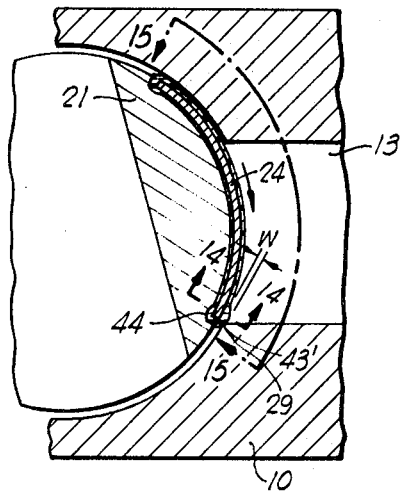
FIG. 13 is an enlarged sectional view of the plug valve with a seal in accordance herewith.
Figure 14:
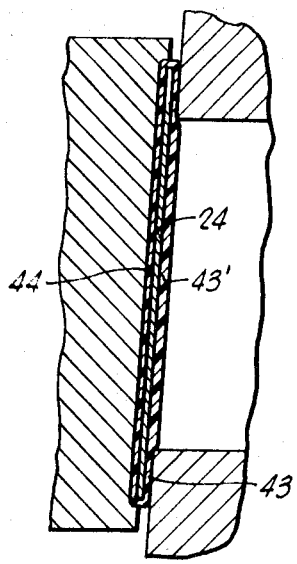
FIGS. 14 and 15 are views taken substantially along the lines 14—14 and 15—15, respectively, of FIG. 13.
Figure 15:
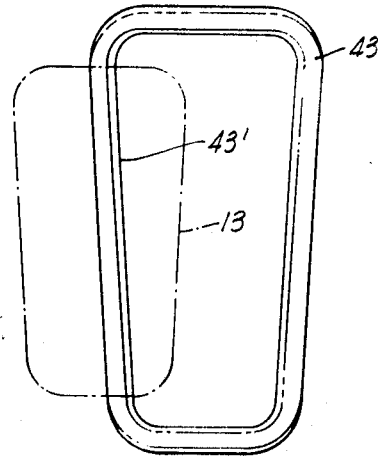
Figure 16:
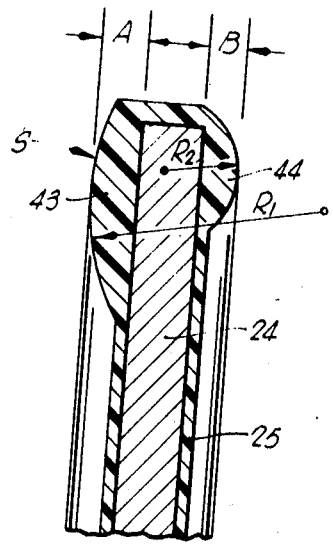
FIGS. 16 and 17 are partial further enlargements through seal sections at which compression occurs and corresponding in view to FIGS. 8 and 9 respectively.
Figure 17:
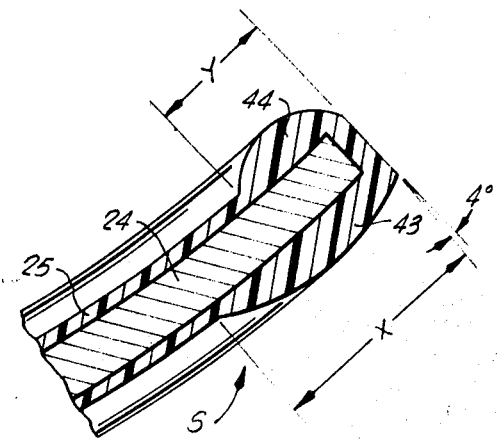

Before describing the seal hereof, it is believed beneficial for purpose of contrast to briefly consider a plug valve seal in accordance with the prior art as illustrated in FIGS. 10–12. As there shown, a prior art valve body 50 includes a fluid inlet or outlet port 51 past which a plug 52 is rotatable. The endless seal element 53 is of O-ring cross section contained in a plug recess 54. It can be seen that when rotating the plug in the arrowed direction of FIG. 10, the portion 53 opposite port 51 (see also FIG. 12) is expanded or swelled a distance "V" and on further plug rotation will be sheared or abraded by port edge 55 as it is formed to become recompressed.

The seal of the invention can be best understood with reference to FIGS. 13–17. Each closure seal S comprises a thin, suitably curved, flexible substrate material 24 such as steel on the order of about 1/16 inches in thickness on which is supported the elastomeric seal material 25 preferably of polyurethane molybdenum-disulphide composition applied as by injecting molding. The coating is usually less than about 1/32 inches thick on each face except about the peripheral edge which is beaded as will be explained.

While the dimensional characteristics of plate 24 will vary with the application of use, it is important to note that the plate 24 has a thickness somewhat in excess of the clearance between the plug P and bore 12 of the well 11. This provides assurance that each closure seal S will remain in position in a recess 23. As can be appreciated, the sealing material 25 for optimum effectiveness should not only have the properties achieved by this invention but should also have the properties of high abrasive resistance and a low coefficient of friction since it is this sealing material which provides the bearing for rotation of the plug.

In order to compensate for the irregularities and fill the void between adjacent surfaces of the plug and body bore, the closure seal S is elastomerically constructed with relative front and back formations in the form respectively of an endless front bead 43 and an endless rear bead 44. As will be further explained, rear bead 44 absorbs disproportionately greater compression than does front bead 43. This serves to restrict the amount of deflection in the sealing face on decompression to a minimum distance "W" (FIG. 13) as the plug is rotated between open and closed positions, such that the resilient recovery of bead portion 43 is substantially less than dimension "V" of the prior art in which the faces are equally deflected. Ideally, it has been found that decompression on the front face should asymptomatically approach zero, but this is impractical because of the resiliency needed to at least compensate for surface, dimensional and/or other manufacturing irregularities encountered from production produced equipment. Minimum front face deflection therefore is usually determined by the range of manufacturing tolerances to be contended with by the front face. With surfaces highly machined to close tolerances, front deflection can be at a minimum to render the back deflection infinitely greater. Of course, other factors, such as the composition of fluid line contents, line pressures for the valve service, etc., also determine the relative deflection to be maintained. By this means, because of the generally reduced or absence of recovery or swelling to the same degree as in the prior art, the abrasion against the sealing face crossing the edges 29 of the body port can be minimized.

Several techniques can be employed for achieving this controlled deflection, including forming front and rear beads either of dissimilar material or of different cross sectional configurations and dimensions or a combination of both. In a preferred embodiment for reasons of economics, the same composition comprising the sealing material 25 is used both front and back with front bead 43 on the front sealing face of different cross sectional configuration than the rear bead 44 on the rear inward face.

In an actual plug valve embodiment for 175 p.s.i.g. gas service rating and a seal formed of a molybdenum disulphide polyurethane composition, bead 43 has a dimension "X" of approximately 9/64 inches with a radii $R_1$ of also approximately 9/64 inches. Bead 44, on the other hand, has a dimension "Y" of approximately 3/32 inches with a radii $R_2$ to its outside of usually slightly less than about 3/64 inches. "A" and "B" are about 1/32 inches each. This produces a relative bead deflection under load of about 2.0–3.6 to 1 in the back compared to the front throughout the general operating pressure range of the valve. It should be understood that "load" as hereinused relates to the pounds of force normal to the gasket and for the plug valve under consideration includes resolved components from both line pressure and the pressure of spring 38. Therefore, depending on the load point, deflection for both surfaces will vary almost linearly from a minimum at low load to about 0.009 and 0.003 for the back and front respectively at a 560 pound load.

By the above description there has been disclosed a novel sealing element for valves whereby the previous undesirable scarifying effect against the seal member is substantially reduced if not actually eliminated. Whereas for the purposes of explanation, the invention has been largely described in preferable association with a plug valve it is not intended as a limitation thereon since the invention can be suitably employed in other well-known valve types.

With reference now to FIGS. 18 and 19, the closure element S in accordance herewith is shown as employed in the structure of a standard bevel gear operated gate valve. As there shown, the valve comprises a main housing 60 having a flow passage 61 in which is interposed a removable gate unit 62. Connected to the gate is a supporting stem 63 operable through a gearbox 64 via a handwheel not shown. When the handwheel is rotated, rotation of the stem 63 effects movement of the gate transverse to the passage 61 usually until completely removed from the position shown to permit free fluid flow through the passage.

On each side face of the gate, raised slightly outwardly therefrom, is an annular disc ring 66 of hard durable material which engages the closure element hereof. The closure element in this embodiment is supported in an annular seat ring 67 having a concentric slot 68 containing the seal hereof. As can be seen, ring 66 is movable with the gate as it advances from between the open and closed position and engages the bead 43 to maintain a positive seal against leakage therepast. By this means leakage cannot occur through the upper portion of the body interior in a manner whereby to bypass the gate between the inlet and outlet ports of the valve during shutoff.

What is claimed is:

1. A valve comprising in combination
   a. a body member defining a fluid passage between ports for the inlet and outlet of fluid flow;
   b. an operable closure member within said body supported movable from a first position in which said passage is open between said ports to a second position in which said passage is closed between said ports; and
   c. a closure seal supported by one of said body member or said closure member and interposed between opposing surfaces thereof when the latter is in said second position to provide a fluidtight seal thereat;
   d. said closure seal comprising a base intermediately supporting elastomeric composition portions on the front and rear thereof, said front portion extending to engage against the facing body or member surface thereat and comprising a first formation means having first deflection properties in response to an incurred compressive force and said rear portion extending to engage against the surface of its supporting member and comprising a second formation means having second deflection properties which in response to an incurred compressive force against said first formation means are relatively greater than that of said first formation means.

2. A valve according to claim 1 in which said closure seal is secured on said valve body member stationary relative to said closure member and said closure member comprises a gate movable transverse to the fluid passage in said body member.

3. A valve according to claim 1 in which said closure seal is supported on the exterior surface of said closure member for movement therewith.

4. A valve according to claim 3 in which said closure member comprises a rotatable plug received within a body well extending into said body passage.

5. A valve according to claim 4 in which the base of said closure seal is curvilinear of extent sufficient to interposedly span the passage to said valve body member and said elastomeric composition is molded to the surfaces thereof for facing said body passage at which said seal is to be effected.

6. A valve according to claim 5 in which the elastomeric composition is formed about at least the front periphery of the base as an endless bead raised from the central base portions thereof.

7. A valve according to claim 6 in which the greater compressive deflection under load at the rear is in the ratio of about 2.0–3.6/1 as compared to the front.

8. In a valve including a body member defining a fluid passage between ports for the inlet and outlet of fluid flow, a closure member within said body member supported for movement from a first position in which said passage is open between said ports to a second position in which said passage is closed between said ports, the improvement comprising a closure seal supported by one of said body member or said closure member and interposed between opposing surfaces thereof when the latter is in said second position to provide a fluidtight seal thereat, said closure seal comprising:
   a. a support base; and
   b. an elastomeric seal secured on opposite front and rear surfaces of said base; and
   c. said elastomeric seal comprising an elastomeric composition on the front surface of said base extending to engage against the facing member surface thereat and comprising a first formation means having first deflection properties in response to an incurred compressive force and an elastomeric composition on the rear surface of said base extending to engage against the surface of its supporting member and comprising a second formation means having second deflection properties which in response to an incurred compressive force against said first formation means are relatively greater than that of said first formation means.

9. The improvement according to claim 8 in which said elastomeric composition is formed with a continuous bead extending substantially coextensive about the periphery of said base and raised from the central base portions thereof.

10. The improvement according to claim 8 in which said base is formed of a thin cross section supporting said elastomeric composition on both faces each having a continuous bead extending substantially coextensive with the periphery of said base and raised from the central base portions thereof.

11. The improvement according to claim 8 in which said closure seal is mounted on the exterior surface of said closure member for movement therewith.

12. The improvement according to claim 11 in which said closure member comprises a rotatable plug received within a body well extending into said body passage, and said base is formed of a thin cross section supporting said sealing composition on both faces each having a continuous bead extending substantially coextensive with the periphery of said base and raised from the central base portions thereof.

13. The improvement according to claim 12 in which said base is curvilinear of extent sufficient to interposedly span the passage to said valve body.

14. The improvement according to claim 13 in which the greater compressive deflection under load at the rear is in the ratio of about 2.0–3.6/1 as compared to the front.

* * * * *